United States Patent [19]
Winslow

[11] 3,927,730
[45] Dec. 23, 1975

[54] VEHICLE BODY DECELERATOR I
[75] Inventor: Gerald R. Winslow, Royal Oak, Mich.
[73] Assignee: United States Steel Corporation, Pittsburgh, Pa.
[22] Filed: Sept. 9, 1974
[21] Appl. No.: 504,147

[52] U.S. Cl.............. 180/82 R; 188/1 C; 267/63 R; 280/106 R; 296/35 B
[51] Int. Cl.²..................... B60R 21/02; B62D 23/00
[58] Field of Search..... 180/82 R, 89 R; 280/106 R; 296/35 R, 35 B; 188/1 C; 267/63 R; 293/1; 213/1 A

[56] References Cited
UNITED STATES PATENTS

| 3,112,950 | 12/1963 | Jaskowiak | 280/106 R X |
| 3,624,764 | 11/1971 | Goben | 188/1 C |
| 3,670,852 | 6/1972 | Yarm | 188/1 C |
| 3,671,068 | 6/1972 | Gerhard | 180/82 R X |
| 3,706,359 | 12/1972 | Skralskis | 188/1 C |
| 3,714,859 | 2/1973 | Tupper | 188/1 C X |
| 3,715,137 | 2/1973 | Sandberg | 188/1 C X |
| 3,717,224 | 2/1973 | Leach | 188/1 C |
| 3,744,818 | 7/1973 | Sandberg | 280/150 B |
| 3,810,656 | 5/1974 | Fox | 188/1 C X |
| 3,860,258 | 1/1975 | Feustal | 180/82 R X |

Primary Examiner—Robert R. Song
Assistant Examiner—Terrance L. Siemens
Attorney, Agent, or Firm—McGlynn and Milton

[57] ABSTRACT
An automotive vehicle assembly which includes a body and a supporting frame with energy absorbing means interconnecting the body and the frame to absorb energy during movement of the body relative to the frame during a collision, or the like. More specifically, the energy absorbing means includes a rod-like member extending through an anvil and having an enlarged cross section and a bend downstream of the anvil and connected to the vehicle body upstream of the anvil whereby upon movement of the body relative to the frame, the rod is pulled through the anvil to remove the bend to absorb energy and decelerate the movement of the body relative to the frame.

8 Claims, 3 Drawing Figures

VEHICLE BODY DECELERATOR I

The subject invention relates to an automotive vehicle assembly and more particularly to an energy absorbing means interconnecting the body and frame of an automotive vehicle for absorbing energy during movement of the body relative to the frame during an impact or collision. With most of the currently utilized connections employed between the body and frame of a vehicle, the body experiences the same G loads during deceleration as the frame experiences. By utilizing the subject invention, the body may move relative to the frame and is decelerated at a significantly slower rate whereby the peak G load experienced by the body is reduced which, of course, provides a much safer situation for an occupant of the vehicle body.

In accordance with the subject invention, the energy absorbing means interconnecting the body and frame of a vehicle includes a member having a bend along its length and an anvil for removing the bend upon movement of the body relative to the frame, as the member is attached to either the body or the frame and the anvil is attached to the other of the body and the frame.

Other advantages of the present invention will be readily appreciated as the same becomes better understood by reference to the following detailed description when considered in connection with the accompanying drawings wherein.

Figure 1:
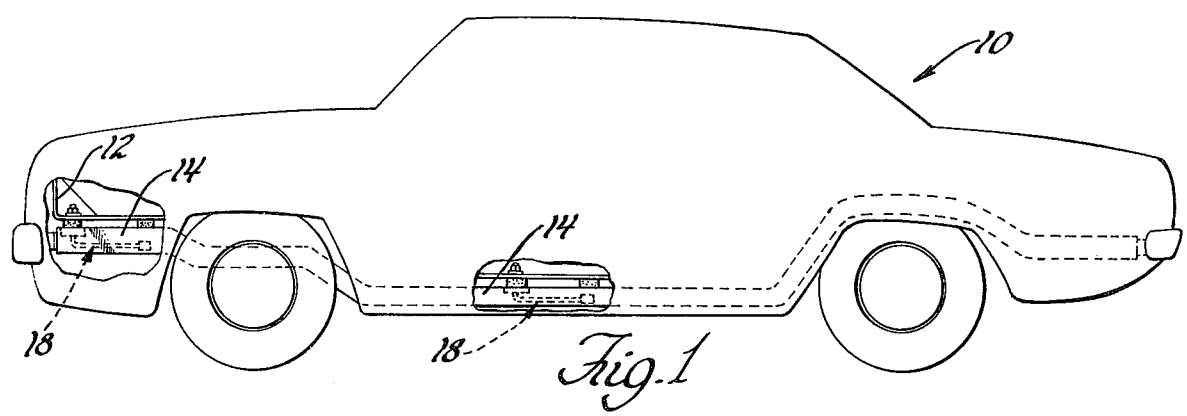
FIG. 1 is an elevational view partially broken away of an automotive vehicle assembly incorporating the subject invention.
Figure 2:
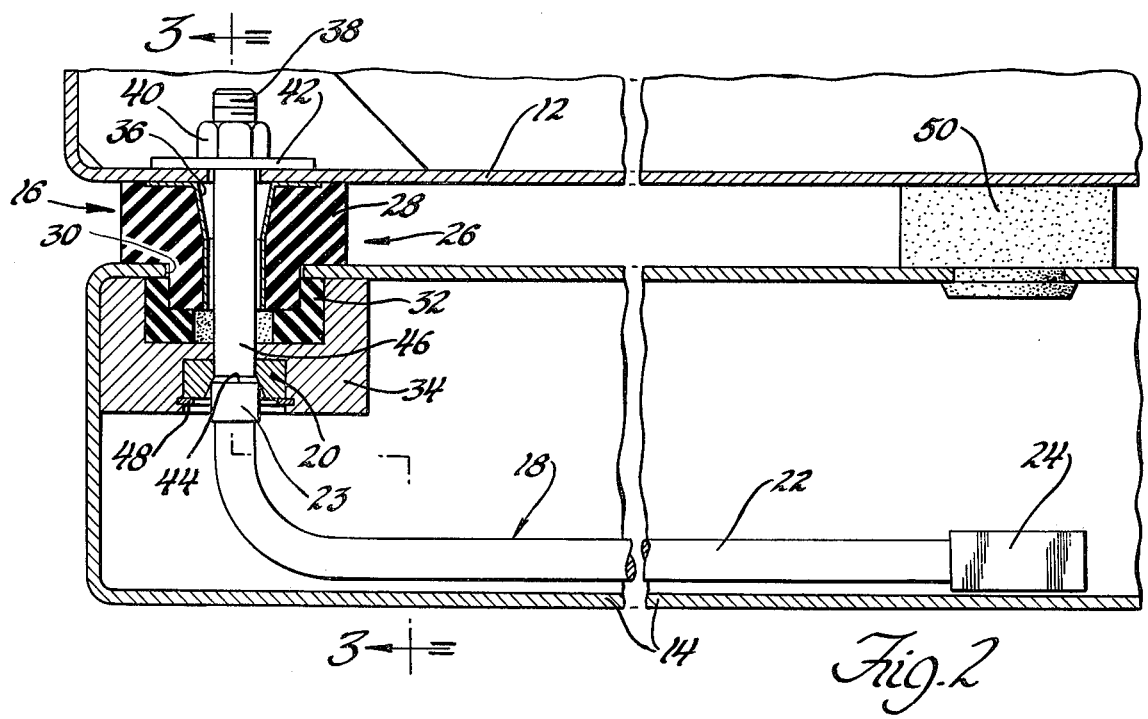
FIG. 2 is an enlarged fragmentary cross-sectional view showing a preferred embodiment of the subject invention.
Figure 3:
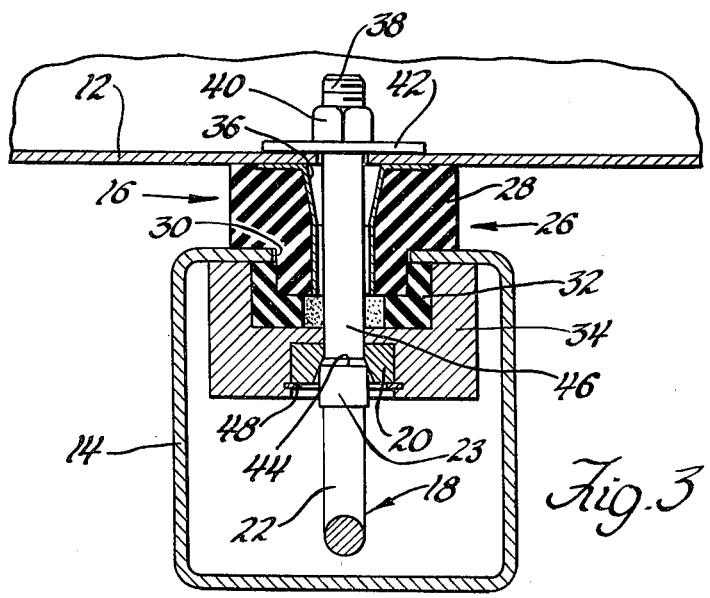
FIG. 3 is a fragmentary cross-sectional view taken substantially along line 3—3 of FIG. 2.

An automotive vehicle assembly constructed in accordance with the instant invention is generally shown at 10 in FIG. 1. The vehicle assembly 10 includes a body 12 and a supporting frame 14. The frame 14 comprises a pair of box-like beam members 14, only one of which is shown.

The assembly 10 also includes an energy absorbing means generally shown at 16 interconnecting the body 12 and the frame 14 and including a bend and means for removing the bend to absorb energy during movement of the body 12 relative to the frame 14.

The energy absorbing means 16 includes an elongated rod-like member gnerally indicated at 18 and an anvil member 20 for extruding the rod 18 upon movement of the body 12 relative to the frame 14. The anvil 20 is made of a harder material than the material of the rod-like member 18 and extends annularly about the member 18. The rod-like member 18 has a free length 22 extending downstream of the anvil 20 and which free length 22 has an enlarged cross section or abutment means 23 which is disposed immediately adjacent the anvil 20. The rod-like member 18 includes an enlarged end 24 disposed at the terminal of the free end 22 thereof for defining a stop for limiting relative movement between the body 12 and the frame 14. In other words, upon movement of the rod-like member 18 through the anvil 20 to extrude the enlarged cross section 23 and remove the bend in free length 22, the enlarged end 24 will engage the anvil 20 to limit movement of the body 12 relative to the frame 14 if the energy dissipated by the member 18 is sufficient to move the enlarged end 24 to the anvil 20.

There is also included shock absorbing mount means generally shown at 26 disposed between the body 12 and the frame 14 for allowing minimal relative movement between the body 12 and the frame 14. More specifically, the mount means 26 comprises a block 28 made of elastomeric material and surrounding the elongated member 18 at a position between the body 12 and the frame 14. The block 28 extends through an aperture 30 in the frame 14 and engages a second elastomeric block 32. The second elastomeric block 32 is disposed within an annular cavity in an anvil retainer 34. Both of the elastomeric blocks 28 and 32 surround the rod-like member 18. A metal insert 36 is disposed within the block 28.

The end 38 of the rod-like member 18 opposite to the terminal end 24 is threaded and a retaining nut 40 is threadedly disposed on the rod-like member 18. A washer 42 is disposed about the upper end of the rod-like member 18 and engages the body 12. The enlarged cross section 44 of length 22 acts as an abutment means and engages the anvil 20 and is urged thereagainst as the rod-like member 18 is placed in tension along the tension portion 46 thereof as the retaining nut 40 is tightened. The tension portion 46 extends between the anvil 20 and the threaded end 38. The retainer member 34 has a second cavity in the bottom thereof in which the anvil 20 is disposed. A snap ring 48 engages the retainer member 34 in the lower cavity for retaining the anvil 20 in the lower cavity.

Additional elastomeric blocks 50 may be disposed between the frame 14 and the body 12 for absorbing shock.

Although in FIG. 1 two assemblies 18 are shown, it should be pointed out that preferably the assembly 18 interconnects the body 12 and frame 14 at a position between the wheels. Further, although the enlarged portion 44 defines an abutment means, it should be appreciated that a shear pin or the like may be utilized instead of the enlarged portion 44. However, in the preferred embodiment, the enlarged portion 44 is extruded through the anvil 20 as the anvil 20 is of a harder material than the material of the rod 18. After the enlarged portion 44 is extruded, the rod 18 is pulled through the anvil 20 so as to remove the bend therefrom to dissipate energy as the bend is removed from the rod 18.

Further, during normal operation, the elastomeric member 28 surrounding the rod 18 acts as a regular body mount.

In the event a vehicle experiences a collision, the frame 14 will be stopped suddenly as it contacts the object with which the collision occurs. However, the body 12 will continue to move as the rod 18 is pulled through the anvil 20 to extrude the enlarged cross section 44 and remove the bend in the rod 18 along the free length 22. As the rod member 18 is pulled through the anvil 20 the bend therein will, of course, be straightened or will move along the rod toward the terminal end 24. As the rod is moved through the die 20, energy is dissipated and the movement of the body 12 relative to the frame 14 experiences deceleration, but deceleration under significantly lower G loads than the situation where the body is rigidly secured to the frame. The elastomeric blocks 28 and 32 absorb shocks and allow some relative movement of the body 12 relative to the frame 14. For example, the block 28 may be compressed to absorb shocks in the event the body 12 moves downwardly toward the frame member 14. The energy absorbing system allows the frame 12 to move relative to the frame 14 in any direction radially of the axis of the tension portion 46 of the rod-like member 18. In other words, the energy absorbing system of this invention will dissipate energy as the body 12 moves in any direction relative to the frame 14.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims, the invention may be practiced otherwise than as specifically described.

The embodiments of the invention in which an exclusive property or privilege is claimed are defined as follows:

1. An automotive vehicle assembly comprising: a body, a supporting frame, a block of elastomeric material supporting said body on said frame, a rod and anvil interconnecting said body and said frame to urge said body against said block and said block against said frame whereby said block may absorb energy as said body and said frame move toward one another, said rod extending through said anvil to a free terminal end downstream of said anvil, said rod having an enlarged cross section downstream of said anvil, said rod having a bend therein downstream of said anvil, the end of said rod opposite to said free end and upstream of said anvil having a retaining nut threadedly disposed thereon to place said rod in tension between said retaining nut and said anvil to urge said body against said block and said block against said frame so that said rod will be pulled through said anvil to absorb energy as a result of a force moving said body away from said frame.

2. An assembly as set forth in claim 1 wherein said anvil is annular and surrounds said rod.

3. An assembly as set forth in claim 2 wherein said anvil is made of a harder material than said rod.

4. An assembly as set forth in claim 3 wherein said free terminal end of said rod is larger than the opening in said anvil for defining a stop for limiting movement of said body away from said frame.

5. An assembly as set forth in claim 1 wherein said anvil is supported by said frame and said rod is attached to said body.

6. An assembly as set forth in claim 1 wherein said block surrounds said rod between said frame and said body.

7. An assembly as set forth in claim 1 wherein said rod has a circular cross section and including abutment means interconnecting said rod and said anvil and being urged thereagainst as said rod is placed in tension by said retaining nut.

8. An assembly as set forth in claim 1 including an anvil retainer having a cavity in which said anvil is disposed, a snap ring engaging said retainer in said cavity for retaining said anvil in said cavity.

* * * * *